2 Sheets—Sheet 1.

J. R. McPHERSON.
Combined Steam and Hydraulic Elevator.
No. 225,851. Patented Mar. 23, 1880.

Witnesses:
P. C. Dietrich
F. O. M'Cleary

Inventor
J. R. McPherson
per S. A. Seymour, Attorney

J. R. McPHERSON.
Combined Steam and Hydraulic Elevator.
No. 225,851. Patented Mar. 23, 1880.

UNITED STATES PATENT OFFICE.

JAMES R. McPHERSON, OF BELOIT, WISCONSIN.

COMBINED STEAM AND HYDRAULIC ELEVATOR.

SPECIFICATION forming part of Letters Patent No. 225,851, dated March 23, 1880.

Application filed February 16, 1880.

*To all whom it may concern:*

Be it known that I, JAMES R. MCPHERSON, of Beloit, in the county of Rock and State of Wisconsin, have invented certain new and useful Improvements in Combined Steam and Hydraulic Elevators; and I do hereby declare the following to be a full, clear, and exact description of the invention, such as will enable others skilled in the art to which it pertains to make and use it, reference being had to the accompanying drawings, which form part of this specification.

My invention relates to an improvement in combined steam and hydraulic elevators.

The object of the invention is to provide a combined steam and hydraulic elevator, in which the cage or car shall be raised by the pressure of steam exerted on a piston connected with the cage by a rope or chain, the steam acting on a water-piston, through which the pressure is transmitted to the column of water in which said piston is located; and to this end my invention consists of the combinations and construction of parts, as will hereinafter be described, and pointed out in the claims.

Figure 1:
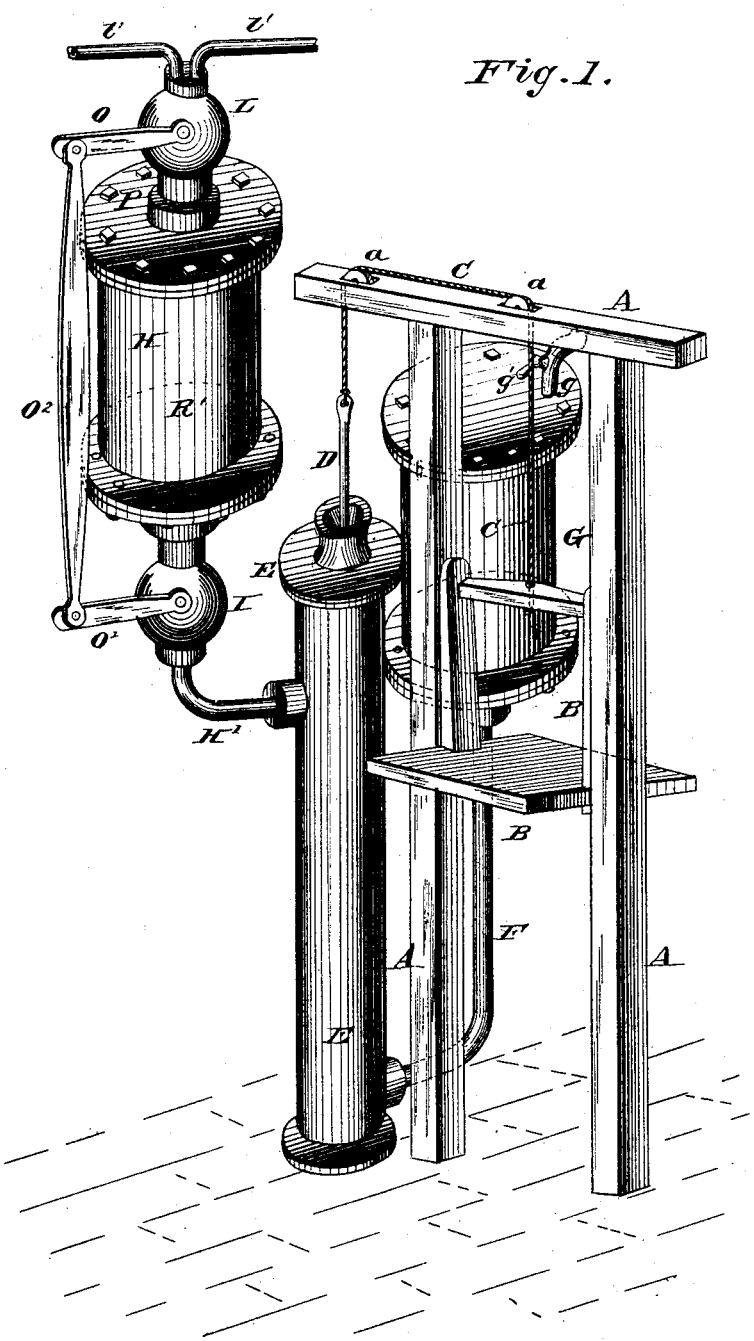
Figure 2:
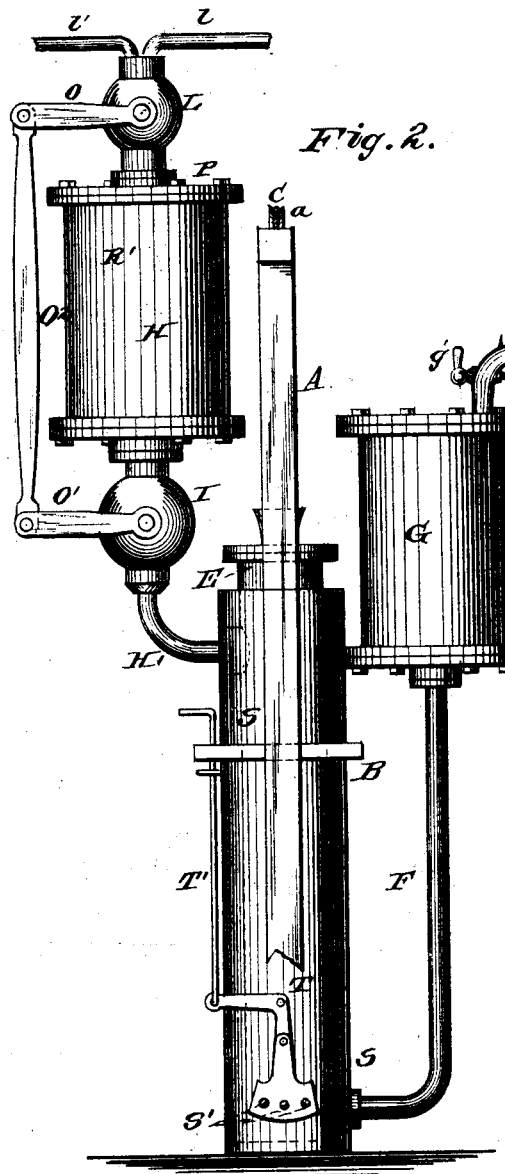
Figure 3:
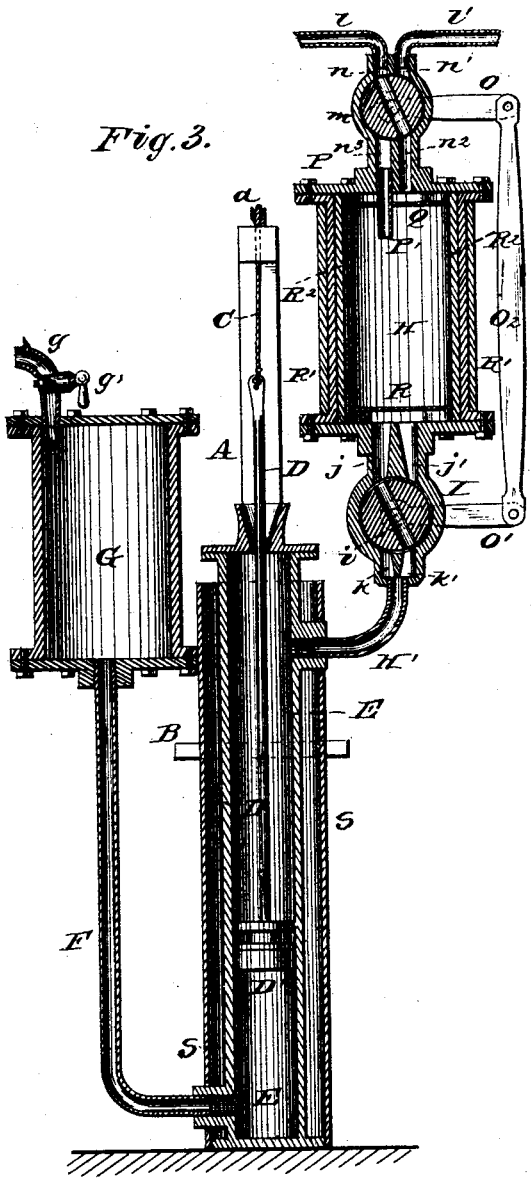

In the accompanying drawings, Figure 1 is a view, in perspective, of a hydraulic elevator embodying my invention. Fig. 2 is a side elevation of the same. Fig. 3 is a vertical section taken through the lifting-cylinder, steam-cylinder, and counterbalance-tank.

A represents the guideways of an elevator, and B the cage. C is a rope or chain attached at one end to the cage C, said chain passing over pulleys $a\ a'$, and attached to the upper end of a piston-rod, D, which latter is provided at its lower end with a piston, D', fitting within the lifting-cylinder E. To the lower end of the lifting-cylinder is connected a counterbalance-pipe, F, which is provided at its upper end with a tank, G, the latter being supplied with an overflow-pipe, $g$, having a valve, $g'$, inserted therein.

The counterbalance pipe and tank F G are extended to a height sufficient to counterbalance the column of water in the lifting-cylinder E. The valve $g'$, when closed, operates to form a partial vacuum in the upper end of the counterbalance-tank, and thereby causes the column of water in the counterbalance tube and tank to act as a force in opposition to the weight of the cage equal to the atmospheric pressure on the column of water in the lifting-cylinder, and when the valve is opened and the atmospheric pressure equalized the column of water in the lifting-cylinder and counterbalance tube and tank will be perfectly balanced. Hence, if desirable, advantage may be taken of the partial vacuum in the counterbalance-tank to compensate for the weight of the cage and variable weight of the rope connected therewith.

To the upper end of the lifting-cylinder E is connected a cylinder, H, by means of a pipe, H', said cylinder H being located a sufficient distance above the top of the lifting-cylinder and counterbalance-tank G to provide a column of water of the requisite height to counterbalance the weight of the cage B.

Between the lower head of the cylinder H and pipe H' is placed a valve-casing, I, in which is placed a water-regulating valve, J, having a through-passage, $i$, formed therein. The valve-casing is provided with upper ports, $j\ j'$, and lower ports, $k\ k'$. By turning the valve J so that its passage $i$ registers with the ports $j\ k'$ a free communication is formed between the steam and lifting cylinders. When the valve is turned midway between the ports $j\ j'$ the communication is cut off between the steam and lifting cylinders. By turning the valve a little farther, so that its through-passage $i$ will register with the ports $j\ k$, communication is again established between the steam-cylinder and lifting-cylinder.

To the upper head of the steam-cylinder H is connected a valve-casing, L, with which communicates the steam-pipe $l$ and exhaust-steam pipe $l'$. Within valve-casing L is placed a valve, M, provided with a single passage, $m$.

The valve-casing is provided with ports $n$ $n'$, which communicate, respectively, with the steam-induction pipe $l$ and steam-eduction pipe $l'$, and with ports $n^2\ n^3$, leading to the upper end of the cylinder. By turning the valve so that its passage-way registers with the ports $n\ n^2$ the exhaust is closed and steam admitted to the upper portion of the steam-cylinder. By turning the valve a slight distance to the right the steam and exhaust ports will be closed, and when the steam-valve is turned still farther the steam-port is closed and the exhaust opened.

To the steam and water valves are secured crank-arms O O', which are connected with each other by a rod or link, O², whereby the valves may be operated simultaneously by means of devices connecting with the cord to be operated by the attendant on the elevator-cage. When the elevator-cage is to be raised, the valves are adjusted so as to establish a communication between the upper end of the steam-cylinder and steam-supply, to allow steam to enter the cylinder, and, also, the water-regulating valve is at the same time adjusted to allow the water to flow from the steam-cylinder into the lifting-cylinder and force the piston through its downstroke, thus raising the elevator-cage.

Should it be desired to stop and lock the cage at any point of its travel, either going up or down, the valves are shifted so as to cut off both steam and exhaust ports, and also the ports connecting the steam-cylinder with the lifting-cylinder, thus confining the column of water within the lifting-cylinder and preventing any portion thereof above the piston from escaping. With the valves in this position it is absolutely impossible for the elevator-cage to move in either direction.

When it is desired to lower the elevator-cage the steam-valve is closed, the exhaust opened, and the passage between the steam and lifting cylinders opened, so that the water in the lifting-cylinder may flow upwardly into the steam-cylinder, and thus allow the piston to rise and the elevator-cage descend by its gravity. The rapidity of its descent is easily regulated by varying the position of the valves. With the valves opened wide the cage will descend quite rapidly, while with a restricted opening the cage may be made to descend as slowly as may be desired.

To the under side of the upper cylinder-head, P, is secured a pipe, P', which communicates with the passage leading to the port $w^3$ or exhaust-port. This projects downward into the cylinder and serves to prevent the escape of all the steam from the upper end of the cylinder when the water flows into the cylinder as the cage is descending. The water forms a water-seal around the opening in the lower end of said pipe P', and thus confines the steam within the cylinder, thus operating to utilize the heat stored in the steam to maintain the water at the desired temperature for preventing the too great condensation of steam in the operation of the elevator.

A deflector, Q, is secured to the under side of the upper head of the steam-cylinder a short distance below the steam-induction passage, and serves to spread the steam over the surface of water in the cylinder, thus preventing the steam from flowing as a jet into the body of water, and thereby becoming rapidly condensed. This deflector may be of any desired construction, and may be provided with any number of perforations. Instead of employing a deflector, a wooden float may be placed on the surface of the water, and the steam caused to impinge on the float, and thus be prevented from too rapid condensation. When a float is used it should be guided within the cylinder by some convenient means—as, for instance, by guides attached to the inner walls of the cylinder—and should have an opening formed therein for the reception of the lower end of the pipe P, so that the float might rise above the lower end of said pipe and allow the latter to be closed by a water-seal, and thus prevent the escape of steam from the upper portion of the steam-cylinder. The pipe P', projecting downwardly into the cylinder, serves another and important function in an elevator wherein steam is employed as the motive power to raise the elevator-cage.

In order that the apparatus shall operate with the minimum expenditure of power and with uniformity, it is necessary that there shall be maintained within the cylinder a certain predetermined head of water. The condensation of steam will suffice to maintain a sufficient and constant supply to maintain the water at a sufficient height in the cylinder; but it becomes necessary to make some provision to regulate the height of the column and prevent the cylinder from becoming filled with water, and this result is effected by means of the pipe P', as the water, when it reaches and seals the lower end of said pipe, prevents the escape of steam therefrom, and the pressure of the confined steam in the upper end of the cylinder operates to force the water above the lower end of said pipe out of the cylinder until the water is on a level with the lower end of the pipe. Thus it will be observed that the pipe serves to maintain the water in the cylinder at a constant and unvarying height, and, as a consequence of this action, maintains a space or steam-chamber in the upper end of the cylinder wherein the steam may be freely deflected and spread over the surface of the water, and thus insure the employment of steam without incurring undue waste by its too rapid condensation.

To the lower head or portion of the cylinder is attached a deflector, R, which is located over the water-passage leading thereto. Deflector R serves to prevent the water from spurting into the cylinder and rapidly condensing the steam.

It is desirable to maintain the water in the steam-cylinder at a sufficiently high temperature to prevent an undue waste of steam by condensation, and hence the outer and inner surfaces of the steam-cylinder are provided with wood linings R' R², which may be secured in place in any manner desired.

In some situations it may be necessary to regulate the temperature of the water and prevent its becoming too highly heated by the steam. To accomplish this result I place an air-jacket, S, around the lifting-cylinder, and provide openings S', one or more, through the lower end of said jacket for the passage of air into the jacket and around the lifting-cylinder. As the latter will be more highly heated at its upper end than at its lower end an upward draft of air will be created, which will operate to cool the lifting-cylinder.

The amount of air admitted within the air jacket or cylinder may be easily regulated by means of a valve or damper, T, and a valve-rod, T', extending up within reach of the attendant, or it may be governed by automatic devices. As heretofore stated, the column of water in the counterbalance tube and tank serves to counterbalance the column of water in the lifting-cylinder, while the column of water in the steam-cylinder and connecting-pipes, located above the lifting-cylinder, serves to counterbalance the weight of the cage. While these provisions are made for fixed and unvarying weights, there is still a necessity for counterbalancing a constantly-varying weight, which is the rope attached to the cage, as the rope is being constantly shifted so as to operate to pull the piston upwardly when the cage is in its lower position, and when the cage is in its highest position the rope acts as a load on the piston. This variable weight or load on the piston is compensated for as follows:

The counterbalance-tank and steam-cylinder are arranged at such heights relative to the height of the column of water in the lifting-cylinder that when the piston has been forced through its downstroke and the water forced from beneath the piston upwardly into the counterbalance-tank, the column of water in the counterbalance tube and tank will overbalance the column of water in the lifting-cylinder to a sufficient degree to compensate for the increased load on the piston, due to the weight of the cord, which has been shifted by the ascent of the cage over onto the piston. When the elevator-cage has descended and the piston traveled through its upward stroke the column of water in the counterbalance tank and tube will again counterbalance the column of water in the lifting-cylinder; but in this position it will be observed that the weight of the rope attached to the elevator-cage has been shifted, so that it tends to pull the piston upwardly. This extra weight is counterbalanced by the increased column of water in the steam-cylinder, which has flowed therein by the ascent of the piston. Hence it will be observed that the column of water in the lifting-cylinder is constantly counterbalanced by the column of water in the counterbalance tube and tank, and also that the weight of the cage is constantly counterbalanced by the column of water in the steam-cylinder. Further, the variable load of the rope or chain connecting with the elevator and tending to force the piston in opposite directions, according to the position of the elevator-cage, is compensated for by the variable height of the columns of water in the counterbalance-tank and in the steam-cylinder. Thus the elevator is operated with the minimum expenditure of power, and the apparatus for imparting motion to the elevator-cage is the embodiment of simplicity and durability in the construction and arrangement of parts.

By the employment of steam as the motive power for raising the elevator-cage any leakage or waste of the contained water in the lifting-cylinder is compensated for by condensation of the steam in the steam-cylinder.

It is evident that the valve mechanism may be varied in its construction and arrangement of parts, that various forms of deflection may be employed, or that they may be dispensed with altogether, although I prefer to employ deflection, and that the air-jacket around the lifting-cylinder may or may not be used; and hence I would have it understood that I do not limit myself to the exact construction and arrangement of parts shown and described.

I make no broad claim in this patent to the combination, with the lifting-cylinder of an elevator, of a cylinder located above the lifting-cylinder, and connected with the upper end thereof, to provide a column of water for counterbalancing the elevator-cage, as I reserve the right to make such claim in a patent founded on a prior application.

Having fully described my invention, what I claim as new, and desire to secure by Letters Patent, is—

1. In a combined steam and hydraulic elevator, the combination, with a lifting-cylinder located in a vertical position, of a steam-cylinder located above the lifting-cylinder, and connected at its lower end with the upper end of the lifting-cylinder, said steam-cylinder provided with valve mechanism for admitting steam to its upper end and for exhausting the steam direct to the atmosphere, and furnished with a steam-deflector located beneath the steam-induction passage, substantially as set forth.

2. In a combined steam and hydraulic elevator, the combination, with a lifting-cylinder, of a steam-cylinder, connected at its lower end with the upper end of the lifting-cylinder, said steam-cylinder provided with valve mechanism for admitting steam to its upper end and for exhausting the steam direct to the atmosphere, and furnished with a deflector in its lower end for preventing the water from spurting upwardly into the cylinder, substantially as set forth.

3. In a combined steam and hydraulic elevator, the combination, with the lifting-cylinder, of a pipe connecting with the exhaust-steam passage, said pipe extending downward any desired distance into said cylinder, substantially as set forth.

4. In a combined steam and hydraulic elevator, the combination, with the lifting-cylinder, of a pipe and tank communicating with the lower end of the lifting-cylinder and an independent pipe and cylinder or tank communicating with the upper end of the lifting-cylinder, said parts being arranged substantially as shown and described, whereby the column of water in the lifting-cylinder, the weight of the elevator-cage, and the variable or shifting weight of the elevator cage or chain will at all times be counterbalanced by the variable height of the columns of water connecting with the opposite ends of the lifting-cylinder, substantially as set forth.

5. The combination, with the lifting-cylinder of a combined steam and hydraulic elevator, of an outer tube or cylinder surrounding the lifting-cylinder, and communicating with the outer air at its upper and lower ends, and arranged to form an intervening air-flue or air-circulating chamber, and means for regulating the flow of air through such flue or air-space, substantially as set forth.

In testimony that I claim the foregoing I have hereunto set my hand.

JAMES R. McPHERSON.

Witnesses:
F. O. McCLEARY,
E. J. NOTTINGHAM.